United States Patent [19]

Lyden

[11] 3,820,397
[45] June 28, 1974

[54] LIQUID LEVEL GAUGE
[75] Inventor: Frank J. Lyden, Manitowoc, Wis.
[73] Assignee: Oil-Rite Corporation, Manitowac, Wis.
[22] Filed: July 21, 1972
[21] Appl. No.: 273,987

[52] U.S. Cl. .................................... 73/328, 73/323
[51] Int. Cl. ............................................ G01f 23/02
[58] Field of Search .............. 73/328, 326, 323, 330

[56] References Cited
UNITED STATES PATENTS

| | | | |
|---|---|---|---|
| 827,713 | 8/1906 | Del Mar | 73/328 |
| 1,359,958 | 11/1920 | Brown | 73/328 |
| 1,511,877 | 10/1924 | Flaherty | 73/327 X |
| 1,989,167 | 1/1935 | Dohrmann | 73/323 X |
| 2,007,687 | 7/1935 | McClain | 73/327 |
| 2,356,267 | 8/1944 | Pelunis | 73/327 X |
| 3,455,163 | 7/1969 | Lukas et al. | 73/328 |
| 3,540,276 | 11/1970 | Lyden | 73/328 |

Primary Examiner—Richard C. Queisser
Assistant Examiner—Daniel M. Yasich
Attorney, Agent, or Firm—Andrus, Sceales, Starke & Sawall

[57] ABSTRACT

The disclosed liquid level gauge includes an assembly of opposied hollow end members having a tubular sight member interposed therebetween and communicating therewith. The assembly is secured together by means disposed within the sight member and connecting the opposed end members. In serivce, fastener means connect at least one of the end members to a tank for mounting the gauge onto the tank and placing the liquid contents of the tank in communication with the sight member.

6 Claims, 5 Drawing Figures

PATENTED JUN 28 1974　　3,820,397

3,820,397

LIQUID LEVEL GAUGE

NATURE AND SUMMARY OF THE INVENTION

This invention relates to a liquid level gauge for indicating the location of the level of the liquid contents in a tank or other reservoir. The gauge of this invention features a relatively wide liquid column viewable frontally from a considerable distance. The gauge further provides for viewing the liquid column from all exposed sides of the gauge as the same is mounted on a tank in service.

Generally, according to this invention, a liquid level gauge comprises a pair of opposed hollow end members. A tubular sight member is disposed between the opposed end members and communicates therewith. Means are disposed within the sight member and connect the opposed end members to unite the end members and sight member into the gauge assembly. In service, fastener means connect at least one of the end members to a tank for mounting the gauge onto the tank and placing the liquid contents of the tank in communication with the sight member.

DESCRIPTION OF THE DRAWING FIGURES

The drawings furnished herewith illustrate the best mode presently contemplated for the invention and are described hereinafter.

DESCRIPTION OF THE ILLUSTRATED EMBODIMENTS

Figure 1:
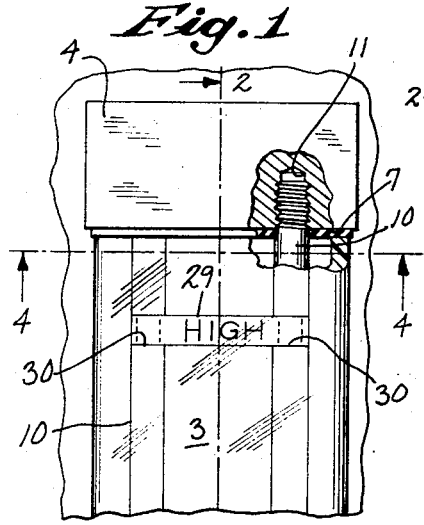
FIG. 1 is a front elevation of a back mounted liquid level gauge embodying the invention with parts broken away and sectioned.
Figure 2:
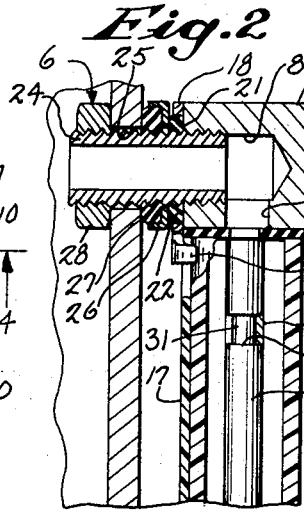
FIG. 2 is a sectional view of the liquid level gauge of FIG. 1 taken generally on line 2—2.

Referring to the drawings, the liquid level gauge 1 of this invention is shown back mounted on a tank 2 and serves to provide a visible indication of the level of the liquid contents in the tank within the range of the gauge.

The gauge 1 generally includes a tubular sight member 3 which is interposed between and communicates with a pair of vertically spaced hollow end members 4 and 5. Fastening means 6 associated with the respective end members 4 and 5 mount the gauge 1 on the tank 2 and are adapted to place the liquid contents of the tank in communication with the gauge.

The tubular sight member 3 is of a rigid transparent plastic material such as a polycarbonate, polysulphon or polyamide and may be made by an extrusion process. The sight member 3 is generally rectangular in section having a greater dimension in width then in depth. While the sight member 3 as assembled into the gauge 1 and mounted on the tank 2 is viewable from the front and either side, its substantial width provides for frontal viewing from some considerable distance.

The upper end of the tubular sight member 3 is closed off by the upper end member 4 with a suitable gasket 7 interposed therebetween. The end member comprises a block-like structure having a horizontal bore 8 generally centrally thereof and which opens rearwardly to provide for communication with the tank 2. A vertical bore 9 intersects with the horizontal bore 8 and opens downwardly to place the sight member 3 in communication with the latter bore.

The sight member 3 is closed at its lower end by the block-like lower end member 5 with a gasket 7 disposed therebetween. The end member 5 may be characterized as being generally hollow similarly to the upper end member 4 in that member 5 is also provided with similar intersecting bores 8 and 9 to provide for communication between the sight member 3 and the tank 2.

The gauge assembly 1 comprising the opposed end members 4 and 5 with the intermediate sight member 3 is secured together by a pair of transversely spaced tie rods or posts 10 which extend vertically interiorly of the sight member. The posts 10 are threaded at their upper end for threaded engagement within the vertical openings 11 spaced generally equidistantly on opposite sides of the vertical bore 9 of the upper end member 4.

The lower end member 5 is provided with vertically extending stepped bores 12 which are generally vertically aligned with the openings 11 of the upper end member 4, and the lower end of the posts 10 extend into the lesser diameter upper portion of the bores 12. The larger diameter lower portion of the bores 12 open downwardly of the end member 5 and are adapted to receive the cap screws 13 which threadedly engage into the internal openings 14 provided in the lower end of the respective posts 10. A nylon sealing washer 15 is disposed on the respective cap screws 13 and is seated against the downwardly facing shoulder 16 formed between the stepped bore portions. With the shoulder 16 providing a bearing for the respective cap screws 13, the corresponding posts 10 are drawn downwardly relative to the screws to thereby draw the opposed end members 4 and 5 tightly against the corresponding ends of the sight member 3 and thus sealingly compress the gaskets 7 therebetween.

The gauge assembly 1 further includes a reflector means or background member 17 generally corresponding in length to and disposed behind the sight member 3 to enhance visibility of the liquid level as viewed from the front of the gauge. The reflector 17 is secured between vertically spaced brackets 18 and 19 which in turn are secured to the corresponding end members 4 and 5.

The upper bracket member 18 is generally flat and overlies the rear face of the end member 4. The bracket 18 projects downwardly beneath the end member 4 to overlie at least the upper end portion of the reflector 17 to confine the latter in the for-and-aft direction. Beneath the end member 4, the bracket 18 is provided with transversely spaced tabs 20 which are crimped forwardly to transversely confine the reflector 17. Bracket 18 is further provided with a circular hole 21 which is larger than and concentric with the horizontal bore 8. An O-ring seal 22 is disposed in the hole 21 and seated against the rear face of the end member 4 circumferentially of the bore 8 with the bracket 18 providing for radial confinement of the seal. Suitable threaded members 23 disposed on opposite sides of the hole 21 secure the bracket 18 to the end member 4.

Threaded members 23 become generally inaccessible after the gauge 1 is mounted on a tank 2 for service.

Figure 3:
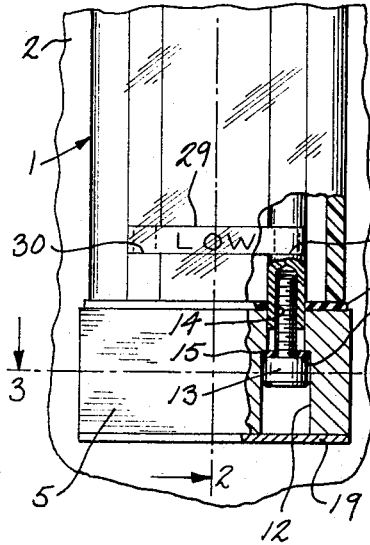
FIG. 3 is a sectional view taken generally on line 3—3 of FIG. 1.
Figure 3:
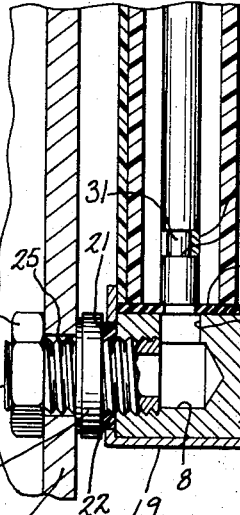
Figure 3:
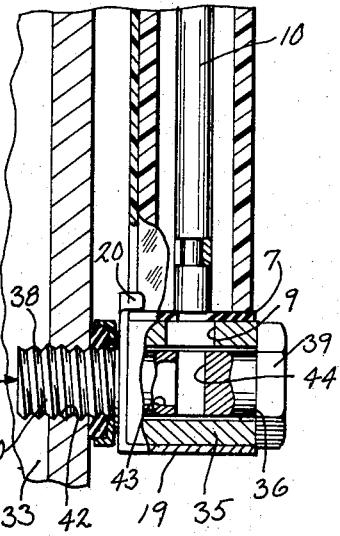
Figure 3:
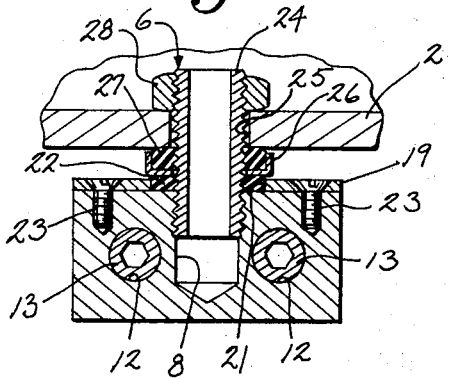
Figure 4:
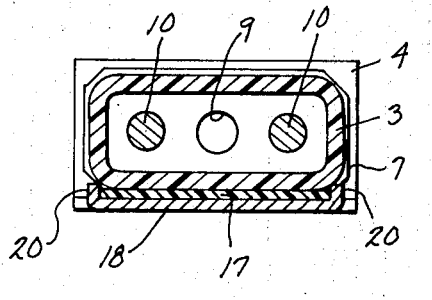
FIG. 4 is a sectional view taken generally on line 4—4 of FIG. 1.

The lower bracket 19 generally comprises an angle member which overlies the rear face and bottom of the lower end member 5. The portion of bracket member 19 which overlies the rear face of end member 5 projects upwardly above the end member to overlie at least the lower end portion of reflector 17. The reflector 17 is further confined by the transversely spaced, forwardly crimped tabs 20 on the bracket 19 above end member 5. Similarly to upper bracket 18, the bracket 19 includes a hole 21 for receiving and confining an O-ring seal 22 circumferentially of the horizontal bore 8 of the lower end member 5. Bracket member 19 is secured to the end member 5 by the transversely spaced threaded member 23 disposed on opposite sides of the hole 21 as generally shown in FIG. 3. The portion of bracket member 19 which extends under or overlies the bottom of end member 5 serves to cover or close the entrances to the stepped bores 12 and render the screws 13 generally inaccessible to thereby preclude possible mischievous tampering when the gauge 1 is in service on a tank 2.

Hollow studs 24 are utilized to mount the gauge 1 onto a tank 2. One end of the studs 24 thread into the respective horizontal bores 8 in the end members 4 and 5. The opposite end of the studs 24 which project rearwardly from the respective end members 4 and 5 are disposed in suitable vertically spaced holes 25 provided in the wall of the tank 2. If the wall of the tank 2 intermediate the vertically spaced holes 25 includes an outwardly projecting weld bead, not shown, or is otherwise rough or uneven, spacer elements 26 may be interposed between the tank 2 and the gauge 1. The spacer elements 26 include a radial flange which engages the O-ring seal 22 forwardly and seats a somewhat larger O-ring seal 27 for engagement rearwardly with the wall of the tank 2. For a tank 2 having a generally smooth wall, the spacer elements 26 together with seals 27 may be omitted and the gauge 1 may be generally flush mounted with the O-ring seals 22 bearing against the tank wall. In either case, a nut 28 is threaded onto the ends of the studs 24 which project through the holes 25 and into the tank 2 to secure the gauge 1 relative to the tank. The mounting arrangement provides for liquid entry to the gauge 1 and the venting of any displaced air to effect a quick level response in the gauge.

If desired, bands 29 carrying "high" and "low" level markings may be mounted across the rods or posts 10 internally of the gauge 1. The bands 29 may be supported by transversely aligned shoulders 30 formed by reduced sections 31 on the respective posts 10.

Figure 5:
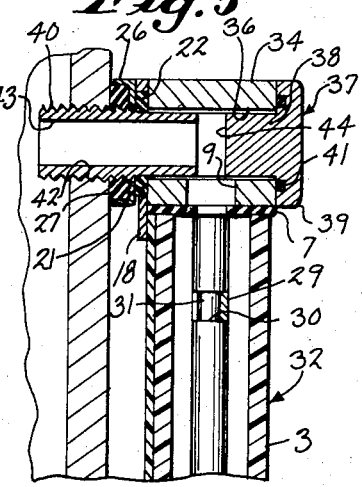
FIG. 5 is a sectional view generally similar to FIG. 2 and shows the liquid level gauge of this invention as adapted for front mounting.

Referring now to the embodiment of FIG. 5, the gauge 32 is adapted for front mounting onto the tank 33. In the gauge 32, the sight member 3 is secured between the opposed end members 34 and 35 by the rods or posts 10 which provide for necessary compression on the sealing gaskets 7. The respective end members 34 and 35 of the gauge 32 are provided with horizontal through bores 36 generally centrally thereof which intersect with the corresponding vertical bores 9. The gauge 32 is shown to include a reflector 17 secured to the gauge by the vertically spaced bracket members 18 and 19 as hereinbefore described.

The fastening means 37 for front mounting the gauge 32 to the tank 33 comprises a bolt 38 having a head 39 and threaded hollow shank portion 40. A bolt 38 extends through the horizontal bores 36 of the respective end members 34 and 35 with the head 39 thereof engaging the front face of the end members. The head 39 of the bolts 38 carry a recessed O-ring 41 for engaging with the front face of the respective end members circumferentially of the horizontal bore 36 to seal the forward end of the bore. As shown, the bolt shank portions 40 which project rearwardly from the gauge 32 are threadedly engageable within the vertically spaced tapped holes 42 provided in the tank 33. The axial bore 43 in the shank portion 40 of bolts 38 is intersected by the cross bore 44 to provide for flow communication between the bores 43 and 36 and hence between the tank 33 and sight member 3 of the gauge 32.

While the gauges 1 and 32 have been described in the orientation shown in the drawings, it should be understood that the gauges could be vertically inverted from the orientation shown. However, if so inverted, the bands 29 carrying the high and low level markings must be correspondingly inverted to be meaningful. Regardless of their orientation, the gauges 1 and 32 provide for closed circuit communication with the tank giving visible indication of liquid level in the tank within the range of the gauge.

Various modes of carrying out the invention are contemplated as being within the scope of the following claims, particularly pointing out and distinctly claiming the subject matter which is regarded as the invention.

I claim:

1. In a gauge assembly for indicating the liquid level in a tank, a pair of vertically opposed end members having passages therein, a tubular sight member disposed between and communicating with the respective end members, at least a pair of spaced tie rods disposed within the sight member, said tie rods being releasably secured at one end to one of the end members, the other of the end members being provided with a stepped through bore corresponding to each tie rod, threaded members having a head portion recessed within the stepped bores and securing the tie rods relative to the other of the end members to thereby unite the end members and sight member of the gauge assembly, and fastener means adapted to connect at least the lower of the end members to a tank for mounting the gauge assembly and to provide for passage means communicating with the passages of the end members in order to place the liquid contents of the tank in communication with the sight member.

2. The invention as set forth in claim 1 wherein a bracket member is secured to the other of the end members and extends over or covers the outer entrance to the stepped through bores therein to generally preclude access to the threaded members securing the tie rods when the gauge is in service.

3. The invention as set forth in claim 2 wherein the bracket member which extends over or covers the entrance to the stepped through bore is an angle member secured to the rear of the corresponding end member by threaded members which become generally inaccessible after the gauge assembly is mounted on a tank for service.

4. The invention as set forth in claim 3 wherein a reflector is disposed behind the sight member and the angle bracket member which extends over or covers the entrance to the stepped through bore serves also to hold or confine at least one end of the reflector in the gauge assembly.

5. The invention as set forth in claim 1 wherein at least a pair of level indicating bands extend transversely between the tie rods within the sight member and the tie rods are circumferentially recessed to provide transversely aligned shoulders for supporting the bands.

6. The invention as set forth in claim 1 wherein a reflector is disposed behind the sight member and is held in place by vertically spaced bracket means secured to the rear of the corresponding end members by threaded members which become generally inaccessible after the gauge assembly is mounted on a tank for service.

* * * * *